United States Patent
Kamath et al.

(10) Patent No.: US 12,423,529 B2
(45) Date of Patent: Sep. 23, 2025

(54) LOW-RESOURCE MULTILINGUAL MACHINE LEARNING FRAMEWORK

(71) Applicant: DIGITAL REASONING SYSTEMS, INC., Franklin, TN (US)

(72) Inventors: Uday Kamath, Ashburn, VA (US); Wael Emara, Plainsboro, NJ (US)

(73) Assignee: DIGITAL REASONING SYSTEMS, INC., Franklin, TN (US)

( * ) Notice: Subject to any disclaimer, the term of this patent is extended or adjusted under 35 U.S.C. 154(b) by 0 days.

(21) Appl. No.: 17/789,396

(22) PCT Filed: Aug. 19, 2021

(86) PCT No.: PCT/US2021/046725
§ 371 (c)(1),
(2) Date: Jun. 27, 2022

(87) PCT Pub. No.: WO2022/040442
PCT Pub. Date: Feb. 24, 2022

(65) Prior Publication Data
US 2023/0177281 A1    Jun. 8, 2023

Related U.S. Application Data

(60) Provisional application No. 63/067,450, filed on Aug. 19, 2020.

(51) Int. Cl.
*G06F 40/58* (2020.01)
*G06F 40/49* (2020.01)

(52) U.S. Cl.
CPC .............. *G06F 40/58* (2020.01); *G06F 40/49* (2020.01)

(58) Field of Classification Search
CPC ................................. G06F 40/58; G06F 40/49
USPC ............................................................ 704/2
See application file for complete search history.

(56) References Cited

U.S. PATENT DOCUMENTS

| | | | |
|---|---|---|---|
| 9,923,931 B1 | 3/2018 | Wagster et al. | |
| 10,445,424 B2 * | 10/2019 | Medlock | G06F 3/0237 |
| 10,878,184 B1 | 12/2020 | Estes et al. | |
| 11,797,530 B1 * | 10/2023 | Bouyarmane | G06N 3/045 |
| 2014/0350920 A1 * | 11/2014 | Medlock | G06F 40/274 704/9 |
| 2020/0265356 A1 * | 8/2020 | Lee | G06Q 10/0635 |
| 2020/0357391 A1 * | 11/2020 | Ghoshal | G10L 15/005 |

FOREIGN PATENT DOCUMENTS

KR      20200092446 A *    1/2019   ............. G06F 40/58

OTHER PUBLICATIONS

T. Mensink, E. Gavves and C. G. M. Snoek, "COSTA: Co-Occurrence Statistics for Zero-Shot Classification," 2014 IEEE Conference on Computer Vision and Pattern Recognition, Columbus, OH, USA, 2014, pp. 2441-2448, doi: 10.1109/CVPR.2014.313. keywords: {Visualization;Support vector machines;Vectors;Seman (Year: 2014).*

(Continued)

*Primary Examiner* — Bharatkumar S Shah
(74) *Attorney, Agent, or Firm* — Bradley Arant Boult Cummings LLP; Adam J. Thompson, Esq.

(57) ABSTRACT

Systems and methods for performing machine learning on multilingual text data.

17 Claims, 12 Drawing Sheets

| Multilingual Learning Paradigm | Available Training Resources | | |
|---|---|---|---|
| | Labeled English Data | Unlabeled English and/or Unlabeled Non-English | Multilingual Human Annotator |
| Zero-Shot | X | | |
| Semi-supervised | X | X | |
| Active | X | X | X |

(56) References Cited

OTHER PUBLICATIONS

Y. Xian, B. Schiele and Z. Akata, "Zero-Shot Learning—The Good, the Bad and the Ugly," 2017 IEEE Conference on Computer Vision and Pattern Recognition (CVPR), Honolulu, HI, USA, 2017, pp. 3077-3086, doi: 10.1109/CVPR.2017.328. keywords: {Training;Protocols;Learning systems;Semantics;Benchmark testi (Year: 2017).*

Zero-Shot Cross-Lingual Opinion Target Extraction Soufian Jebbara and Philipp Cimiano Semalytix GmbH, Bielefeld, Germany Semantic Computing Group, CITEC—Bielefeld University, Bielefeld, Germany (Year: 2019).*

T. Mensink, E. Gawes and C. G. M. Snoek, "COSTA: Co-Occurrence Statistics for Zero-Shot Classification," 2014 IEEE Conference on Computer Vision and Pattern Recognition, Columbus, OH, USA, 2014, pp. 2441-2448, doi: 10.1109/CVPR .2014. 313. keywords: {Visualization; Support vector machines; Vectors;Seman (Year: 2014).*

Y. Xian, B. Schiele and Z. Akata, "Zero-Shot Learning—The Good, the Bad and the Ugly," 2017 IEEE Conference on Computer Vision and Pattern Recognition (CVPR), Honolulu, HI, USA, 2017, pp. 3077-3086, doi: 10.1109/CVPR.2017.328. keywords: {Training;Protocols;Learning systems; Semantics; Benchmark tes (Year: 2017).*

Zero-Shot Cross-Lingual Opinion Target Extraction Soufian Jebbara and Philipp Cimiano Semalytix GmbH, Bielefeld, Germany Semantic Computing Group, CITEC—Bielefeld University, Bielefeld, Germany (Year: 2019) (Year: 2019).*

Zero-Shot Cross-Lingual Opinion Target Extraction Soufian Jebbara and Philipp Cimiano Semalytix GmbH, Bielefeld, Germany Semantic Computing Group, CITEC—Bielefeld University, Bielefeld, Germany (Year: 2019) (Year: 2019) (Year: 2019).*

T. Mensink, E. Gawes and C. G. M. Snoek, "COSTA: Co-Occurrence Statistics for Zero-Shot Classification," 2014 IEEE Conference U_ l on Computer Vision and Pattern Recognition, Columbus, OH, USA, 2014, pp. 2441-2448, doi: 10.1109/CVPR .2014.313. keywords: {Visualization; Support vector machines;Vector (Year: 2014).*

Y. Xian, B. Schiele and Z. Akata, "Zero-Shot Learning—The Good, the Bad and the Ugly," 2017 IEEE Conference on Computer V_ l Vision and Pattern Recognition (CVPR), Honolulu, HI, USA, 2017, pp. 3077-3086, doi: 10.1109/CVPR.2017.328. keywords: {Training;Protocols;Learning systems; Semantics; Benchm (Year: 2017).*

Zewen Chi et al: "Can Monolingual Pretrained Models Help Cross-Lingual Classification?", arxiv.org, Cornell University Library, 201 Olin Library Cornell University Ithaca, NY 14853, Nov. 10, 2019 (Nov. 10, 2019), pp. 1-5.

Yichao Lu et al: "A neural interlingua for multilingual machine translation", arxiv.org, Cornell University Library, 201 Olin Library Cornell University Ithaca, NY 14853, Apr. 23, 2018 (Apr. 23, 2018), pp. 1-9.

Dong Xin XD48@Rutgers Edu et al: "Leveraging Adversarial Training in Self-Learning for Cross-Lingual Text Classification", Proceedings of the 21th ACM International Conference on Intelligent Virtual Agents, ACMPUB27, New York, NY, USA, Jul. 25, 2020 (Jul. 25, 2020), pp. 1541-1544.

Sara Rosenthal et al: "A Large-Scale Semi-Supervised Dataset for Offensive Language Identification", arxiv.org, Cornell University Library, 201 Olin Library Cornell University Ithaca, NY 14853, Apr. 29, 2020 (Apr. 29, 2020), pp. 1-14.

PCT Application No. PCT/US2021/046725, International Search Report and Written Opinion, Feb. 11, 2022, 19 pages.

* cited by examiner

| Multilingual Learning Paradigm | Available Training Resources | | |
|---|---|---|---|
| | Labeled English Data | Unlabeled English and/or Unlabeled Non-English | Multilingual Human Annotator |
| Zero-Shot | x | | |
| Semi-supervised | x | x | |
| Active | x | x | x |

*FIG. 1*

LOW-RESOURCE MULTILINGUAL MACHINE LEARNING FRAMEWORK

CROSS-REFERENCE TO RELATED APPLICATIONS

This application is a national stage filed under 35 U.S.C. § 371 of PCT/US2021/046725 filed Aug. 19, 2021, which claims priority to and benefit of U.S. Provisional Patent Application No. 63/067,450 filed Aug. 19, 2020, which are hereby incorporated by reference in their entireties.

BACKGROUND

Business is conducted across the globe with employees communicating in many languages over chat, email, and voice, among other forms of electronic communications. Despite the abundance of English language resources, collecting data to train text classification for employee conduct surveillance models in English is not an easy task. Among other reasons, this is due to the scarcity of useful positive training samples, domain specific, idiomatic, colloquial, and often slang language and the semantic complexity of the conduct surveillance task where individuals purposefully try to evade the conduct monitoring systems by using subtle language. The problem can be exponentially harder for non-English languages where the data sources are less available (low-resource) and it can be hard or costly to hire interpreters with relevant skills to annotate non-English data at scale. Finally, dominance of idiomatic and colloquial language makes it hard to use auto-translation as a reliable option to obtain non-English training data. The above challenges render the problem of low-resource multi-lingual text classification for challenging domain-specific, colloquial, and idiomatic language a very difficult problem with very limited progress in existing methods where models are pre-trained using generic language collected from open sources. Therefore, among other needs, there exists a need for a low-resource multilingual machine learning framework that addresses these and other issues.

SUMMARY

Embodiments of the present disclosure are directed generally towards computer implemented systems and methods for performing multi-lingual language modeling. Other aspects and features according to the example embodiments of the present disclosure will become apparent to those of ordinary skill in the art, upon reviewing the following detailed description in conjunction with the accompanying figures.

BRIEF DESCRIPTION OF THE DRAWINGS

Reference will now be made to the accompanying drawings, which are not necessarily drawn to scale.

FIG. 1 is a table showing the relationship between different multilingual machine learning paradigms and the available training resources that can be applied, according to one embodiment of the present disclosure.

FIGS. 2A-2D illustrate a two-moon data set and label propagation in semi-supervised learning according to one embodiment of the present disclosure, wherein: FIG. 2A depicts a dataset including few labeled samples and abundance of unlabeled samples; FIG. 2B shows the dense areas of unlabeled samples for the dataset in FIG. 2A; FIG. 2C shows how labels can propagate through the dataset; and FIG. 2D shows the stage after labels have been propagated to all unlabeled samples in the dataset.

DETAILED DESCRIPTION

Figure 2A:
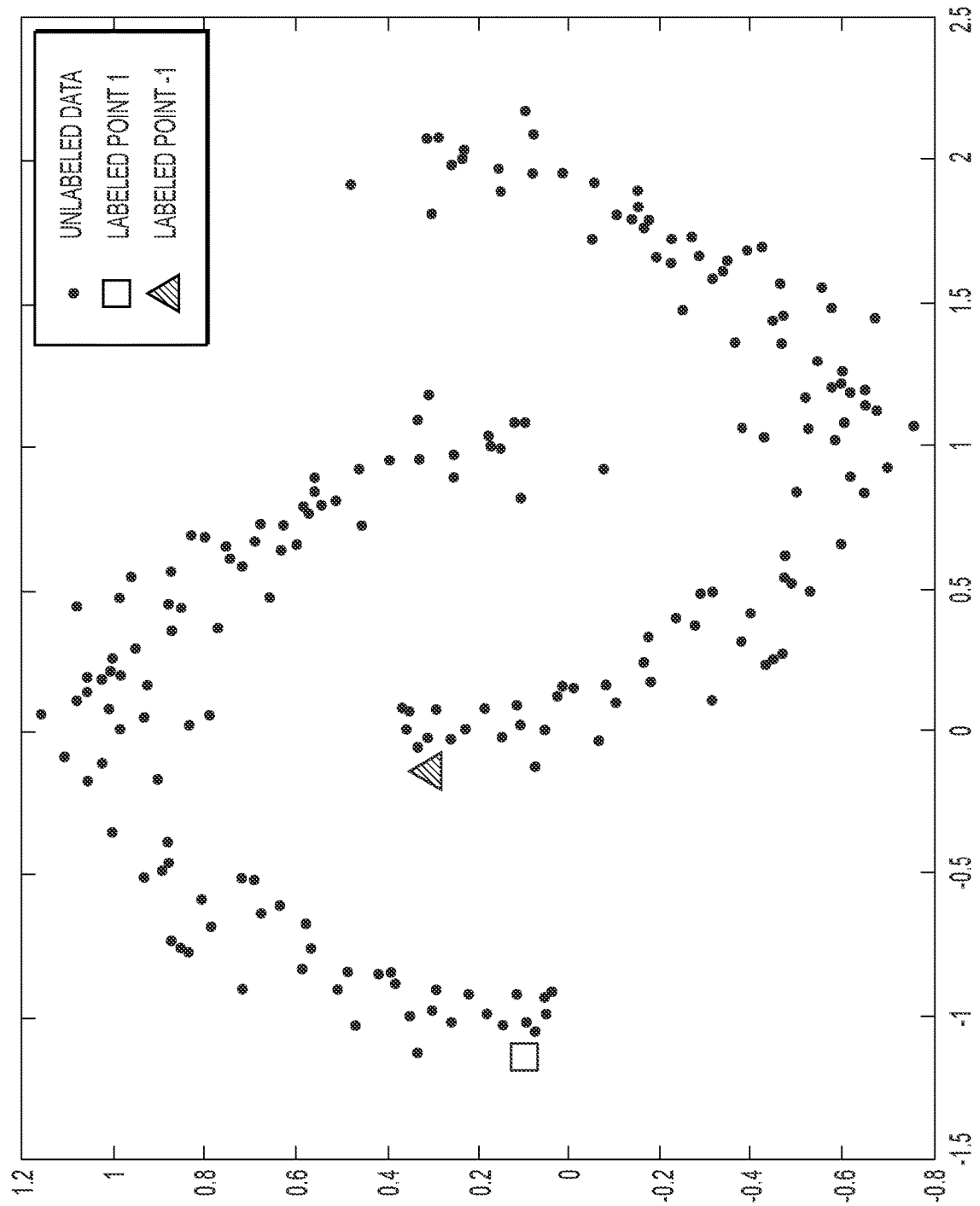

In some aspects, the present disclosure relates to systems and methods implementing a multilingual machine learning framework. Although example embodiments of the present disclosure are explained in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an" and "the" include plural referents unless the context clearly dictates otherwise. Certain values may be expressed in terms of ranges "from" one value "to" another value. When a range is expressed in terms of "from" a particular lower value "to" a particular higher value, or "from" a particular higher value "to" a particular lower value, the range includes the particular lower value and the particular higher value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

A detailed description of aspects of the present disclosure, in accordance with various example embodiments, will now be provided with reference to the accompanying drawings. The drawings form a part hereof and show, by way of illustration, specific embodiments and examples. In referring to the drawings, like numerals represent like elements throughout the several figures. Some experimental data are presented herein for purposes of illustration and should not be construed as limiting the scope of the present disclosure in any way or excluding any alternative or additional embodiments.

This present disclosure, according to some aspects, includes systems and methods directed to the problem of limited or low-resource cross-lingual text classification. Various embodiments of the present disclosure are applicable to text classification problems where a classifier is used with text in multiple languages (e.g., text corresponding to multiple types of spoken languages) and the availability of training data varies significantly across languages. As a non-limiting example, one implementation can be for electronic communications monitoring in financial institutions for the purpose of employees' conduct surveillance and compliance assurance.

Conduct surveillance as referred to herein can refer to monitoring electronic communications between persons, where the communication(s) include text, in order to identify indications of human conduct that violates a policy, ethical standard, and/or law, as some examples. As used herein, "text" or "text data" can refer to unstructured text data and/or structured text data that is formatted such that it may be "labeled" (aka "annotated) as described herein. As non-limiting examples, unstructured text data may be received/input/ingested and accepted in a UTF-8 text format, and structured text data may be received/input/ingested and accepted in a specified XML format, among other commonly used data formats. Further discussion of conduct surveillance consistent with certain aspects described herein can be found in U.S. Pat. Nos. 10,878,184 and 9,923,931, both of which are hereby incorporated by reference in their entireties.

In some embodiments, the text that is labeled/annotated for, e.g., text classification may correspond to a segment of text in the form of a sentence, paragraph, page, and/or entire document. In some embodiments, the text that is operated upon in accordance with various embodiments herein may be considered to be a type of natural language processing (NLP). Additional detail regarding these aspects may be found in U.S. Pat. No. 10,878,184, which is hereby incorporated by reference in its entirety.

The disclosed systems and methods, according to some embodiments, include and utilize a system architecture configured to handle several progressions of resource availability. Based on analysis of the text, samples of the text can be analyzed using different machine learning systems suitable for each sample. The disclosed systems and methods include different levels of classification, including limited labeled English training data analyzed using cross-lingual zero-shot learning. In the case of large unlabeled English/non-English data, cross-lingual semi-supervised learning can be used. In the case of access to English/non-English human resources (e.g., human translators or annotators), cross-lingual active semi-supervised learning can be used.

Throughout the present disclosure, "labeled" data such as text data is also sometimes referred to as "annotated" data; also, "unlabeled" data such as unlabeled text data is also sometimes referred to as "unannotated" data.

The systems and methods according to some implementations of the present disclosure can include the use of cross-lingual active semi-supervised learning based on an ensemble deep learning architecture. A non-limiting example of an ensemble deep learning architecture is a multi-headed attention-based ensemble, as shown in FIG. 7.

Figure 7:
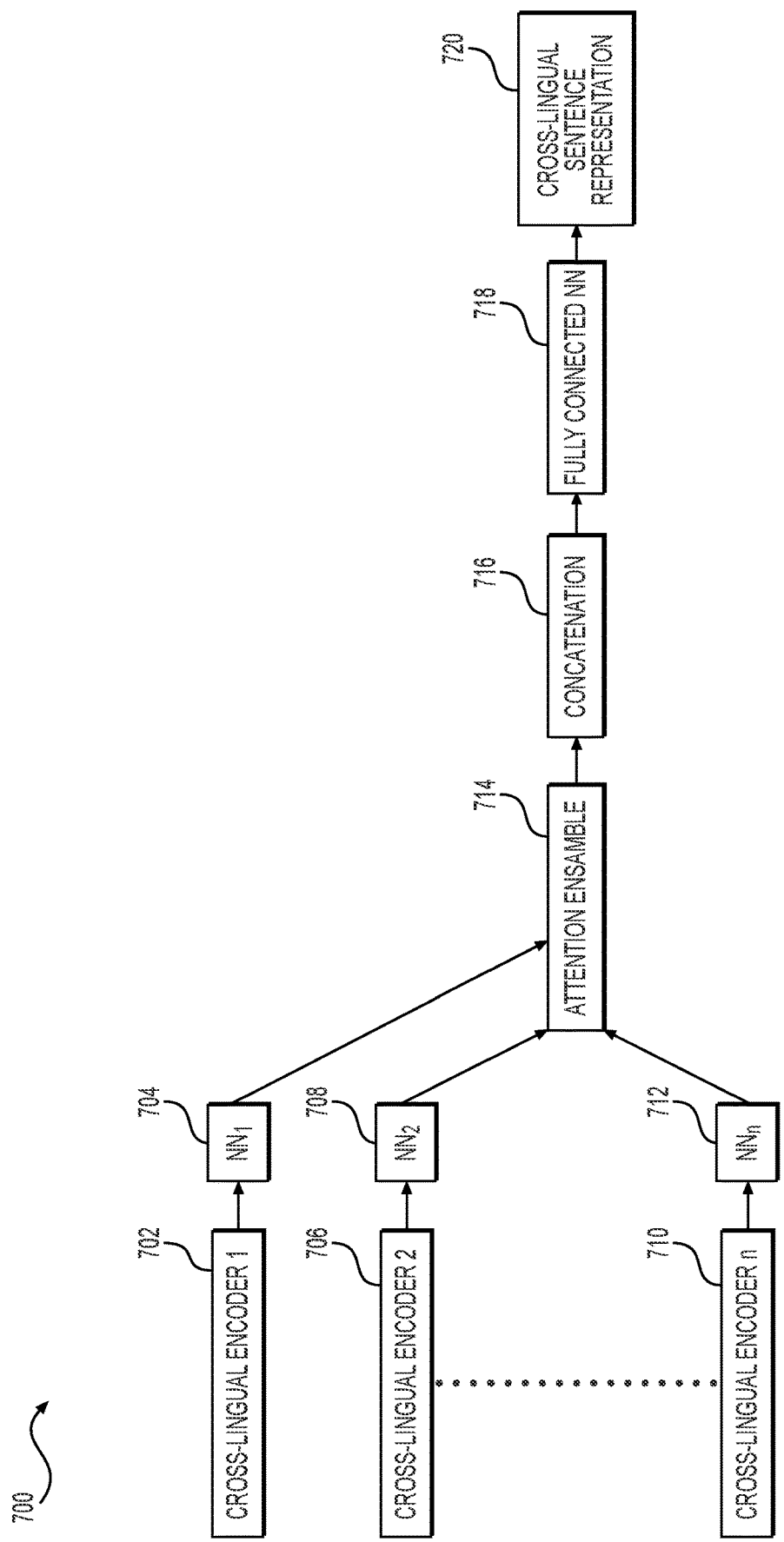
FIG. 7 is a diagram of a multi-headed attention-based ensemble architecture utilized in accordance with one or more embodiments of the present disclosure.

FIG. 7 depicts the components of a multi-headed attention-based cross-lingual ensemble-based encoder. A number of cross-lingual encoders (see, e.g., 702, 706, 710 in FIG. 7) can be paired with neural networks (shown as "NN1" 704, "NN2" 708, and "NNn" 712). According to some embodiments of the present disclosure, multiple deep-learning architectures can be used simultaneously for cross-lingual sentence encoding. Non-limiting examples of deep learning architectures include text sequence modeling approaches such as RNN, LSTM and transformers as well as diverse context lengths, and diverse pre-training tasks. Each cross-lingual sentence encoder can identify different semantic signals and can perform cross-lingual semantic alignment in different ways. For example, the different approaches can include word-level dictionary-based multilingual alignment, and sentence-level translation-based multilingual alignment. According to some embodiments of the present disclosure, a multi-headed attention-based ensemble can be used to combine the outputs of the different encoders into a single weighted cross-lingual sentence representation. As shown in FIG. 7 the outputs of the multi-heads can be concatenated and passed through a linear neural network to reduce the dimensionality. Multi-headed attention-based ensembles can find an optimal set of transformations to combine cross-lingual sentence encodings that best fits each learning task.

Further, disclosed systems and methods include the use of active learning criteria including using multi-lingual samples which can reduce text classification confusion. Additionally, disclosed samples can aid or improve cross-lingual semi-supervised classification through improved traversal of dense regions in the cross lingual embedding space. Idiom detection can also be applied to improve cross-lingual embedding space alignment. Further, multi-lingual sample selection can accommodate availability of English and/or non-English annotation assignments, and the use of English and non-English annotation assignments can be based on a budget.

Various embodiments of the present disclosure implement a machine learning framework that handles different levels of resource availability, as illustrated in the table of FIG. 1. In some embodiments, zero-shot learning is the component with the least required resources, which involves training models only on English labeled data within a cross-lingual embedding space. The trained model can be directly used on non-English languages, and in some embodiments of the present disclosure the trained model can be used on non-English languages with no training on non-English data. Labeled data can be hard and expensive to acquire, however unlabeled data can be abundant and cheap to collect. Despite the lack of labels, unlabeled data can hold a significant wealth of information about the patterns in the data, such as clustering patterns and lower dimensional manifolds descriptors.

Another level of resource availability is where there is limited labeled English data and large unlabeled English and/or unlabeled non-English data. Semi-supervised learning in accordance with various embodiments of the present disclosure can make the best use of both labeled and unlabeled data, where the unlabeled data is used to guide the decision boundary imposed by the very limited labeled data. Given the limitations on acquiring labeled data, using semi-supervised learning is a natural learning paradigm to make the best use of the available data. Various embodiments of the present disclosure can perform multilingual semi-supervised text classification where the unlabeled data can be a mix of languages. In addition to, or alternative to, the cross-lingual embedding techniques described herein in example contexts such as conduct surveillance, additional and/or alternative approaches such as LASER, mBERT, XLM-R and USEm may be utilized.

Figure 2B:
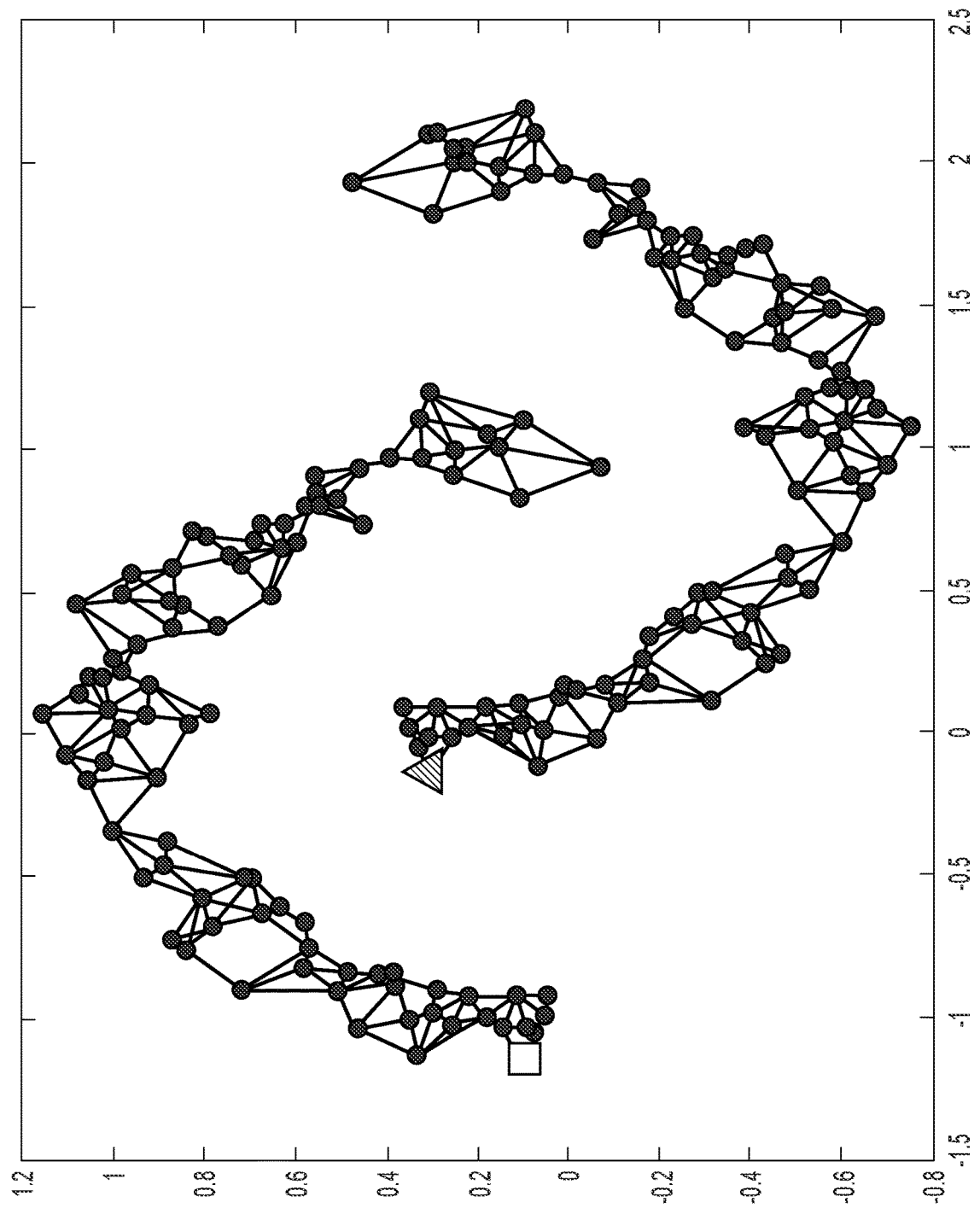
Figure 2C:
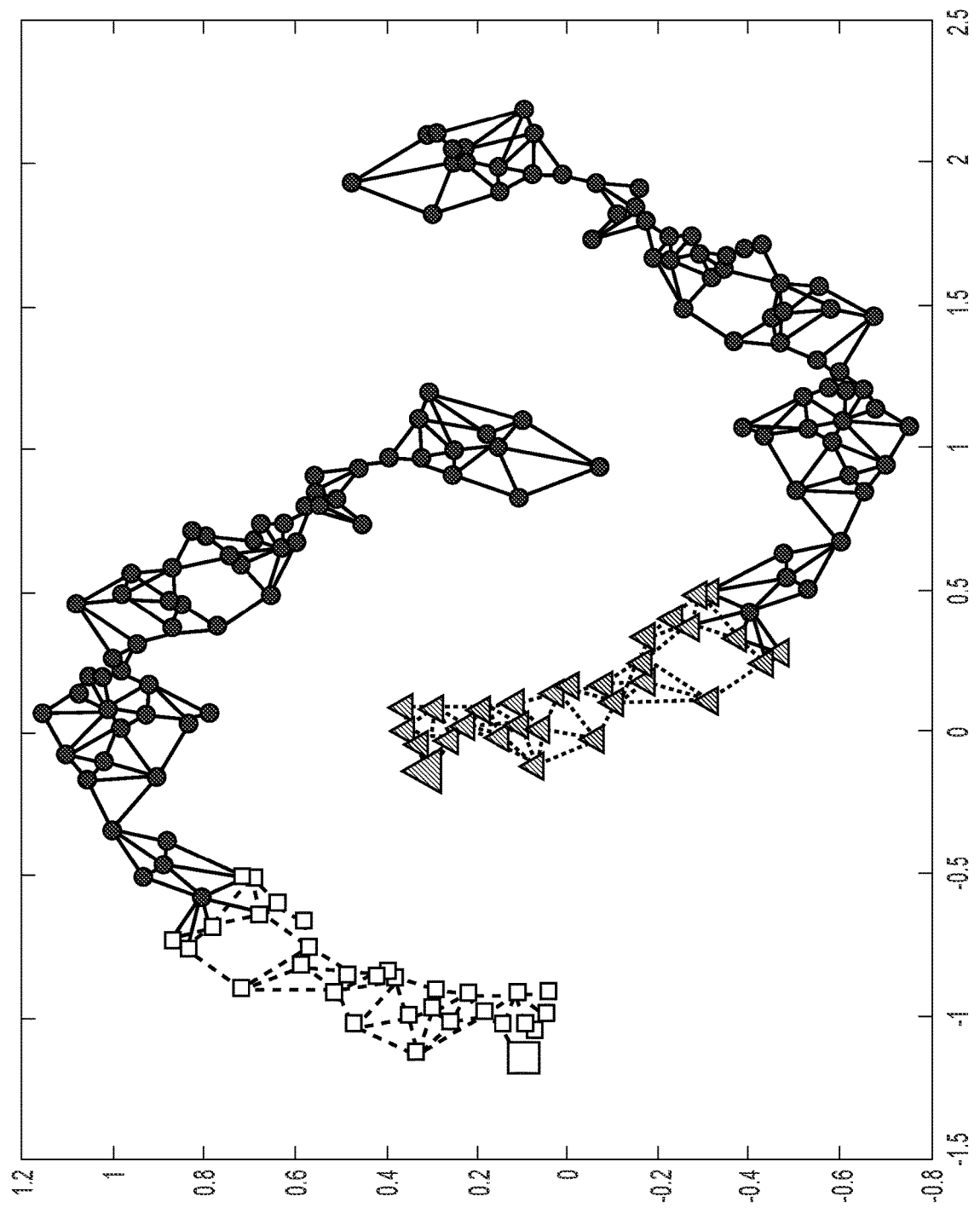
Figure 2D:
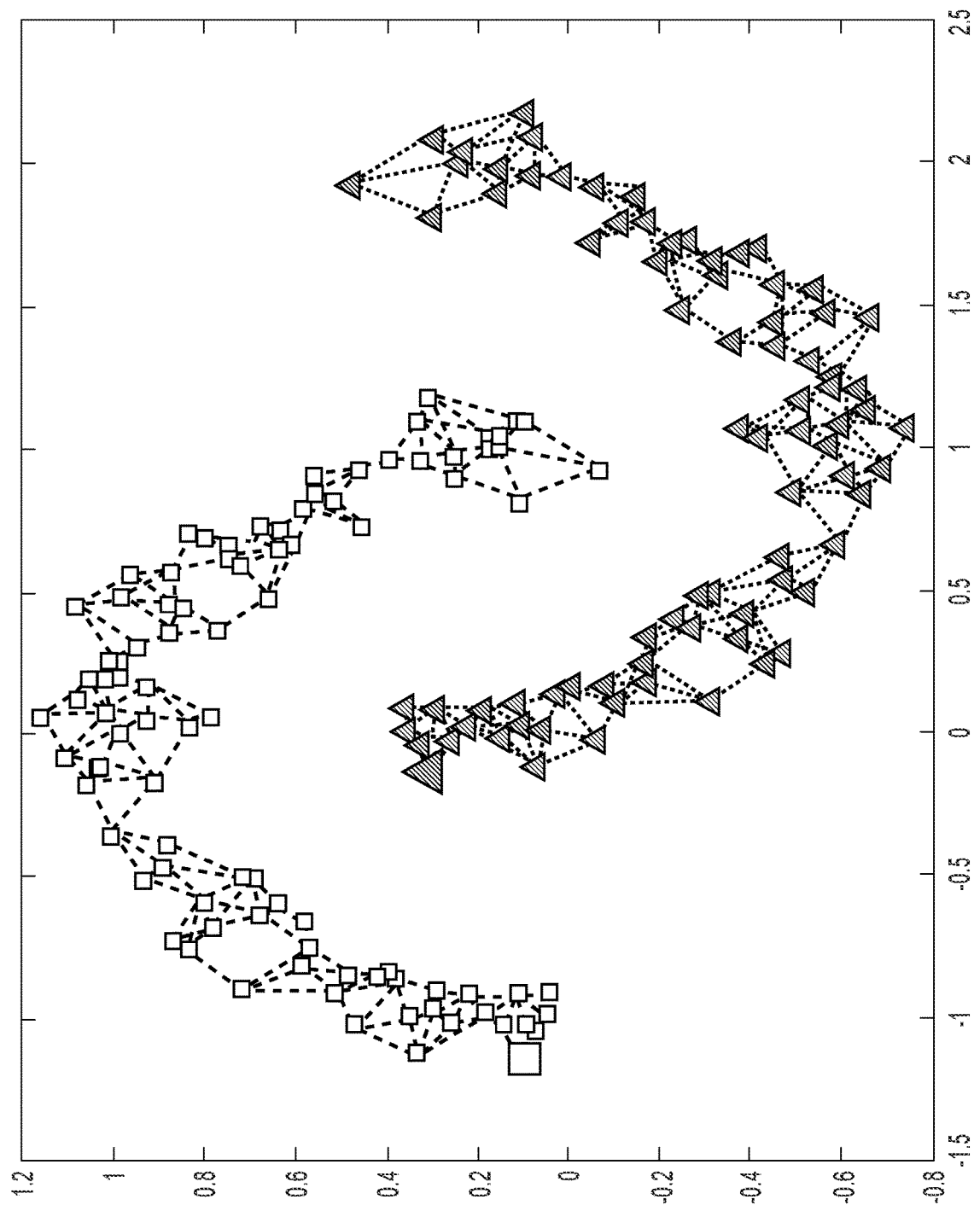

FIGS. 2A-2D illustrate a two-moon data set depicting label propagation in semi-supervised learning according to one embodiment of the present disclosure. The two-moon data set shown in FIGS. 2A-2D is an illustrative 2D dataset where each half-moon comes from a different class and illustrates a non-linear classification task. A non-limiting example of label-propagation for semi-supervised learning is shown. In semi-supervised learning, there can be few labeled samples and abundance of unlabeled samples as shown in FIG. 2A. Semi-supervised learning can use the unlabeled data to establish dense areas or clusters to help make best use of labeled samples. FIG. 2B shows the dense areas of unlabeled samples for the data set in FIG. 2A. Based on the detected dense unlabeled areas in FIG. 2B semi-supervised learning can proceed by propagating the labels from the labeled samples to unlabeled samples through dense unlabeled regions. FIG. 2C shows how labels can propagate through the dataset, and FIG. 2D shows the stage after labels have been propagated to all unlabeled samples.

Figure 3:
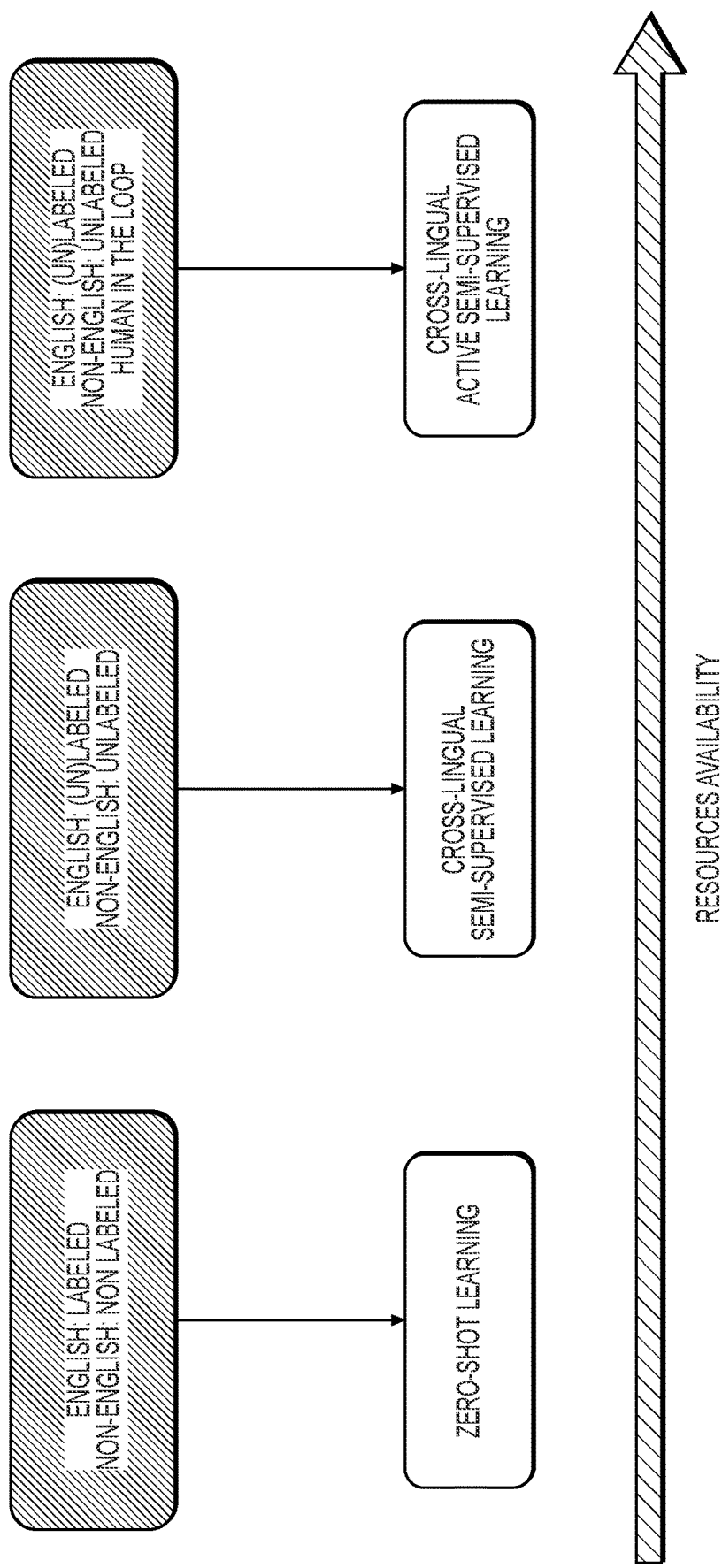
FIG. 3 illustrates resource availability as corresponding to different machine learning techniques to be utilized, according to one or more embodiments of the present disclosure.

According to some embodiments of the present disclosure, the last level of resource availability can be using human annotators to label data. Finding sufficiently skilled human annotators can be expensive and difficult, especially in the case of multilingual annotators. Some embodiments of the present disclosure include a suite of cross-lingual active semi-supervised learning algorithms that use cross-lingual embeddings to infer and select the most valuable samples to be tagged by an annotator. The suite of semi-supervised active learners covers a wide spectrum of criterion that takes into consideration the speed and quality of training, updating the cross-lingual embedding, as well as the optimal resource assignment for hiring human annotators. FIG. 3 illustrates how the different components of an embodiment of the system can be used as more resources become available.

Some embodiments of the present disclosure can include a cross-lingual text encoder. The cross-lingual text encoder can include a set of ensemble deep learning systems that learn text representations from data sets in multiple languages. These ensemble deep learning systems align semantically similar representations across languages. The module can learn from combinations of monolingual, parallel or unaligned multilingual corpora. This encoder can serve as a generic cross-lingual pretrained text encoder. A variety of open source multilingual data sources can be used in the training, for example articles, books, chats, and/or common crawl data.

Figure 4:
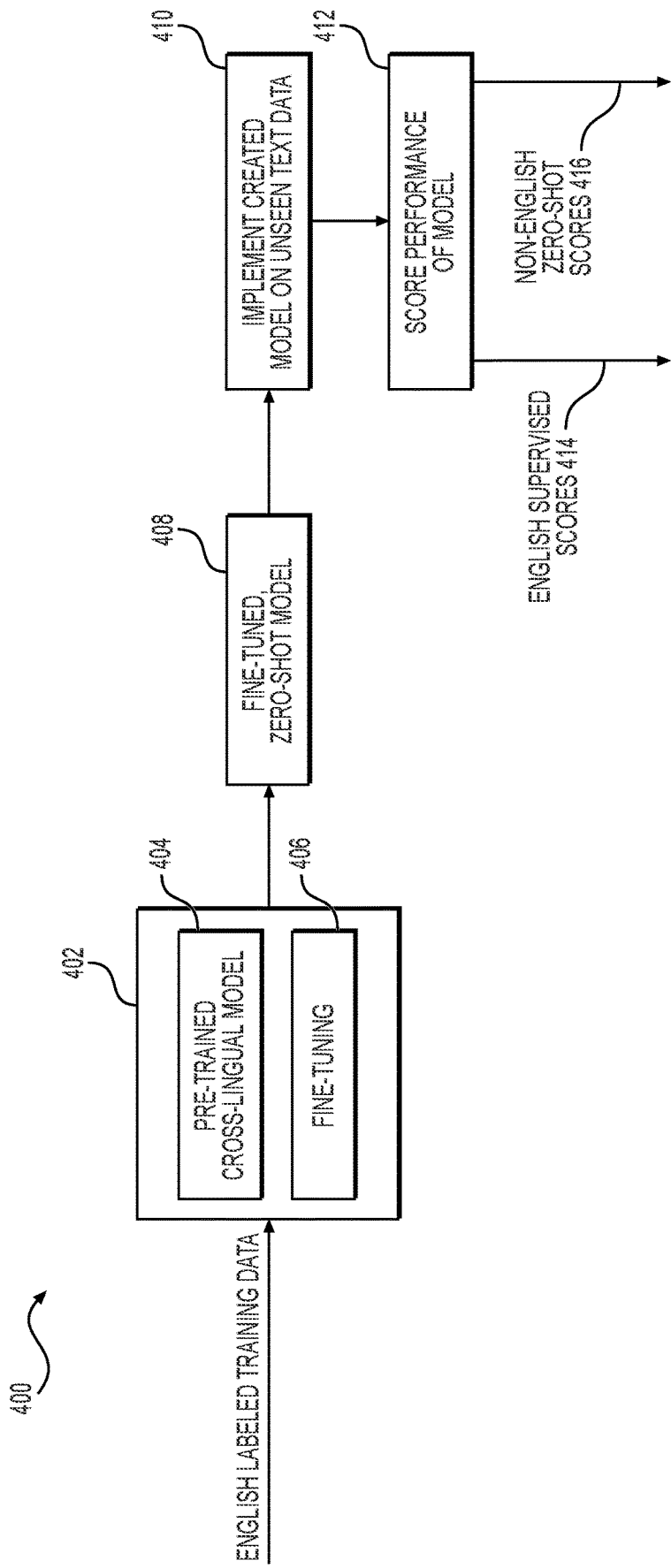
FIG. 4 illustrates a flow diagram of operations for machine learning on text data using a zero-shot cross-lingual classification technique, according to one or more embodiments of the present disclosure.

Some embodiments of the present disclosure can perform cross-lingual zero-shot learning. The cross-lingual zero-shot learning component can be used when only limited English training data is available. The limited English training data can be used atop the cross-lingual text encoder to create a cross-lingual classifier. A resulting trained model can then be used directly to classify multilingual data. The zero-shot learning system can be a system that has never been trained on non-English language text but is capable of classifying non-English text. FIG. 4 depicts a non-limiting example of the information flow for the zero-shot cross-lingual model. The different learning modules, including the cross-lingual zero-shot learning module, the cross-lingual semi-supervised learning module, the cross-lingual textual encoder module, and other machine learning methods may be used in different combinations to perform textual classification, and the representations shown herein are intended only as non-limiting examples of how different multilingual machine learning paradigms can be combined.

Further, some embodiments of the present disclosure can perform cross-lingual semi-supervised learning. Unlabeled data can be cheap to curate, and when, in accordance with the implementation of certain embodiments described herein, have access to large amounts of unlabeled English and/or non-English data, the patterns in that data can help enhance the limited zero-shot model by exposing patterns in the data space that guide the learning algorithms towards better generalization. The exposed patterns in unlabeled data can manifest themselves in many ways, such as clusters or lower dimensional manifolds that reduce the model learning complexity.

Figure 5:
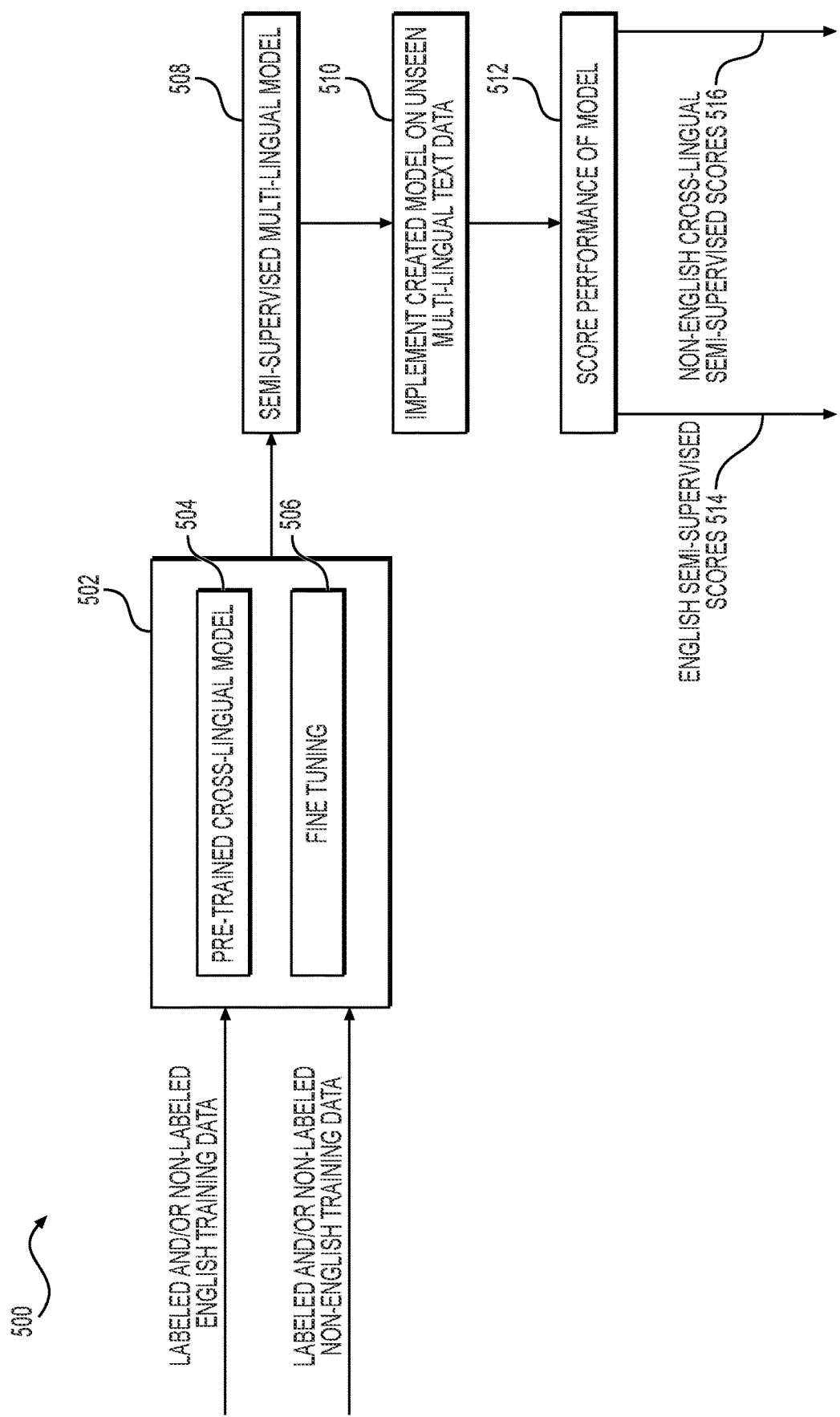
FIG. 5 illustrates a flow diagram of operations for cross-lingual semi-supervised learning, according to one or more embodiments of the present disclosure.

FIG. 5 illustrates a non-limiting example of a structure of a cross-lingual semi-supervised learning architecture. Embodiments of the present disclosure can also include cross-lingual semi-supervised active learning. The cross-lingual semi-supervised active learning component can be used when human annotators are available to perform text annotation. Human annotators can be both scarce and expensive. Human annotators may need to be both subject matter experts (SMEs) and/or multilingual speakers. Embodiments of the present disclosure can use the human annotation resources efficiently by selecting samples to be annotated and the type of annotation required subject to a budget of available human hours and cost.

The selection criteria can be optimized by the system to achieve the best performance gain for the training system at the least cost. The cross-lingual semi-supervised active learning system can use different criteria to select samples for human annotation. Each criterion targets part of the cross-lingual semi-supervised classification system.

The criteria used by the cross-lingual semi-supervised active learning system can include active learning criteria. Described herein are several non-limiting examples of criterions that may be used as part of the cross-lingual semi-supervised active learning system, but other criterions are contemplated.

Some embodiments of the present disclosure can use a confusion criterion, in which the targets are the most confusing samples that would benefit the cross-lingual semi-supervised learner. These can be samples with low classification confidence scores across different languages.

Further, some embodiments of the present disclosure can use data coverage criterions that target samples that achieve best maximal coverage (i.e., exemplary representation) of unlabeled cross-lingual data distributions to enhance semi-supervised inference performance.

Some embodiments of the present disclosure also can include criterions configured to identify colloquial language, domain specific language, and idioms. Due to the informal nature of many communications, idioms can be heavily used in some text samples. Idioms in different languages can be expressed using completely different words, (e.g. "When pigs fly"→(French) "Quand les poules auront des dents" which mean "when hens have teeth"). Proper translations for idioms can be used to update and better realign the pre-trained cross-lingual embeddings.

Additionally, embodiments of the present disclosure can implement cross-lingual idiom detection. According to one embodiment of the present disclosure, data sets, including open source data sets and multilingual data can be provided, and annotators can provide a description for each idiom in the native language of that idiom. The description can be a simple description that does not include idioms or multi-word expressions. Therefore the descriptions of each idiom in each language can be semantically similar, and the multilingual idioms can align in the cross-lingual semantic space. Open source multilingual data can be searched for multi-word-expressions that occur in the same format consistently. As non-limiting example of open source multilingual data is online forums, which can include cases where the description of the idiom is included.

The present disclosure also contemplates the use of automated tools to determine whether a description of an idiom is sufficiently simple. According to some embodiments, the automated tools can determine whether a description of an idiom contains multiword expressions (a measure of semantic complexity). Based on the determination of the automated tools, a human annotator can be asked to rephrase an idiom description to make the idiom description simpler.

"Annotator Availability" is another criterion that can be used in embodiments of the present disclosure. The availability of annotation resources can be an important criterion for active learning, where initially selected tasks are regenerated or broken down using other languages/tasks to mitigate the lack of resources for a specific task/language.

Some embodiments of the present disclosure can also include an annotation budget criterion. Each active learning criterion can require a human annotator with a certain level of skills. For instance, the "Confusion Criterion" can require a multilingual speaker SME, which may be hard to hire and therefore expensive. The "Data Coverage Criterion" can be performed using data exploration tools. Therefore, it only needs a relatively moderate level of linguistics or SME skills. The "Cross-lingual Encoding Criterion" can require a multilingual speaker (preferably native) that might not need to be an SME if they are only required to translate generic idioms and slang language. However, if they need to translate industry jargon, then an SME may be required.

Given a budget, the active learning algorithm can optimize selecting samples using multiple criteria to enhance the cross-lingual classification performance. Budget optimization takes into consideration how different types of annotators (e.g., generic English annotators) can be easier to hire, and therefore can be cheaper, than other (e.g., specialist or non-English speaking) annotators. Budget optimization can also take into account task difficulty estimates in distributing tasks to annotators to make the best use of the annotator's skills. In some embodiments of the present disclosure, a system can assign SME or other specialists' tasks that are worth their time. Similarly, the system can assign generic (e.g. non-SME) annotators tasks that they can perform with high confidence because the tasks have been selected based on an initial analysis of the text).

Budget optimization also accounts for the unavailability of annotators for certain tasks and communicates with the active learning task generator to regenerate tasks using available resources or closely aligned languages. Over time, annotators' performance can also be evaluated and scored. The budget optimization system can use such scores in assigning future tasks. Further, the feedback for cross-lingual semi-supervised active learners from human annotators is not limited to sentence labels.

As described above, the present disclosure in some embodiments can involve the use of human annotators. Human annotators may perform different operations in conjunction with the machine learning system described herein in order to classify text. Several non-limiting examples of human annotator tasks are described herein. For example, a human annotator can perform sentence labeling for non-English sentences (potentially requiring a multilingual SME). The human annotator may also evaluate semantic similarity. Semantic similarity can require the human annotator to determine if pairs of sentences are semantically similar. When performing semantic similarity evaluations, the human annotator may not need to provide a label for the classification task. Semantic similarity can be evaluated in pairs of sentences where each sentence is in a different language, or each sentence is in the same language. For example, the sentences may be pairs of English/English sentences, English/non-English sentences, or non-English/non-English sentences. An SME may not be required to perform semantic similarity evaluations.

The human annotator can also perform translation tasks, in which the human annotator is asked to provide a translation of a sentence between two languages (for example, from English to another language, or from another language to English). This human annotator may not be an SME. Embodiments of the present disclosure can combine human and machine translations using criterions described herein. For example, embodiments of the present disclosure may select text that is suitable for machine translation (for example, because it is considered simpler or because it lacks idioms) and assign the simpler text for machine translation. More complicated text (e.g., text including idioms) may be assigned to human annotators for translation.

Some embodiments of the present disclosure include a task difficulty estimator that can be used to determine which text is suitable for machine translation. The task classification and difficulty estimators can decide which part of the cross-lingual semi-supervised learning system to serve. For example, one classifier may be a general versus domain specific language classifier for performing multi-lingual classification of text language into generic versus domain specific language. This can be used to decide which annotator should be assigned this text; a generic annotator (an annotator who is not an expert) or an SME. It can also help in classifying active learning tasks aimed at enhancing the cross-lingual embedding space versus other tasks aimed at fine-tuning the cross-lingual embedding space for a specific domain.

Another Semantic Complexity Estimator and Idiom Detector estimates how semantically involved a piece of text is or whether it is an idiomatic expression. This is an indicator of how difficult it is to translate such text. Low complexity text can be auto translated, while semantically complicated text and idioms need human annotators of various skill levels.

Different existing methods of cross-lingual embeddings may be utilized with certain aspects and embodiments of the present disclosure disclosed herein, although it should be appreciated that the existing methods themselves are not inventive aspects sought to be patented according to the present application, nor do they limit the patentable scope of patentable aspects described herein. These methods can vary in the underlying architectures, covered languages, type of data used for pre-training, and the cross-lingual embedding spaces that they produce. Some embodiments of the present disclosure train a deep learning model to integrate the strengths of multiple cross-lingual embeddings to create an improved representation of the data. For example, different cross lingual embedding may only succeed with specific semantic scenarios and may fail with other semantic scenarios. These semantic scenarios include negation, word ordering, and active/passive voice, along with many other semantic properties. Different methods of cross lingual embedding used in different embodiments of the present disclosure may have different structures.

A discussion of the various drawings presented for the present application will now be more specifically discussed in further detail. Now referring specifically to FIG. 4, FIG. 4 illustrates a flow diagram 400 of operations for machine learning on text data using a zero-shot approach, in accordance with an embodiment of the present disclosure. FIG. 4 corresponds to the circumstances in FIG. 1 wherein the available training resources are previously labeled/annotated English language text data for training, i.e., this text data has been previously annotated, for example by supervised annotation. Thus, as shown at block 402, the input text data for training and building the model includes previously labeled English language text data.

A predictive model 408 can then be created through training using input data that includes the previously labeled English language text data. To create the model 408, the labeled data can also be used in conjunction with previous, pre-trained models, such as a pre-trained cross-lingual model 404. The model is fine-tuned (see 406) by adding and training supervised learning task specific layers atop the pre-trained cross-lingual model 404. Fine-tuning can also be extended also to update and improve the pre-trained cross-lingual model 404. 408 represents the resulting trained and fine-tuned model.

The primary technique for generating the model as illustrated in the embodiment shown in FIG. 4 is by zero-shot machine learning. As will be recognized by those skilled in the art, zero-shot translation can generally refer to translating between language pairs on which a neural machine translation system has never been trained, and the resulting translation is an emergent property when training the system in multilingual settings. The produced model 408 can then be implemented and evaluated, respectively, for classifying new text data that has never been seen (unseen English and/or Non-English data that is unlabeled/unannotated and can be structured and/or unstructured in nature, for example) and scoring the confidence in the accuracy of the produced predictions (see 412).

The evaluation, determined in terms of a score, can be evaluated by a score for the accuracy of the model in accurately predicting known, English data that has been evaluated through human supervised learning (see 414), and/or the evaluation can be made to produce a score for the predictive accuracy of the model produced by the zero-shot technique (as applied to English and/or Non-English (e.g., multilingual) data) (see 416). In some embodiments, these resulting scores can be compared to a proven, supervised-produced model to determine whether it is acceptable for use by a user, etc., for example by setting a threshold of acceptability for the score or a threshold with respect to comparison to the supervised-based model. Additionally and/or alternatively, the English predictions can be evaluated against a testing set and the non-English predictions can be evaluated through verification by a multilingual user such as a multilingual annotator or analyst.

Now referring specifically to FIG. 5, FIG. 5 illustrates a flow diagram 500 of operations for machine learning on text data using, in accordance with an embodiment of the present disclosure, a semi-supervised multi-lingual machine learning technique. FIG. 5 corresponds to a situation wherein the available training resources (inputs) include labeled and/or non-labeled English training data and also include labeled and/or non-labeled non-English training data (feeding into block 502). As shown at block 502, the input text data for training is used for building a pre-trained cross-lingual model 504. Fine tuning of the training is also performed, as shown at 506. Fine-tuning of the model, as shown at 506, involves adding and training semi-supervised learning task specific layers atop the pre-trained cross-lingual model 504. Fine-tuning can also be extended to update and improve the pre-trained cross-lingual model using the usually large amount of labeled/non-labeled data available through semi-supervised learning.

A predictive model 508 (semi-supervised, multi-lingual model) is created. To create the model 508, the labeled data can also be used in conjunction with previous, pre-trained models, such as a pre-trained cross-lingual model 504. 508 represents the resulting trained and fine-tuned model (see fine tuning 506). The primary technique for generating the model as illustrated in the embodiment shown in FIG. 5 is by semi-supervised model training. The semi-supervised model training involves the use of a human annotator that reviews predictions of labels to and corrects any incorrect predictions, then allows a subsequent run of training to improve the model in its prediction ability.

The created model 508 can then be implemented and evaluated, respectively, for classifying new, multi-lingual text data that has never been seen (see 510). Next at step 512, the confidence in the accuracy of the produced predictions (see 512) is scored. The evaluation, determined in terms of a score, can be evaluated by a score for the accuracy of the model in accurately predicting known, English data that has been evaluated through human supervised learning (see 514, English, semi-supervised learning), and/or the evaluation can be made to produce a score for the predictive accuracy of a model produced by semi-supervised model training as applied to previously unseen non-English cross-lingual semi-supervised data (see 518, Non-English cross-lingual semi-supervised scores 516.

These resulting scores can be compared to a proven, supervised-produced model to determine whether it is acceptable for use by a user, etc., for example by setting a threshold of acceptability for the score or a threshold with respect to comparison to the supervised-based model. Additionally and/or alternatively, the English predictions can be evaluated against a testing set and the non-English predictions can be evaluated through verification by a multilingual user such as a multilingual annotator or analyst.

Figure 6:
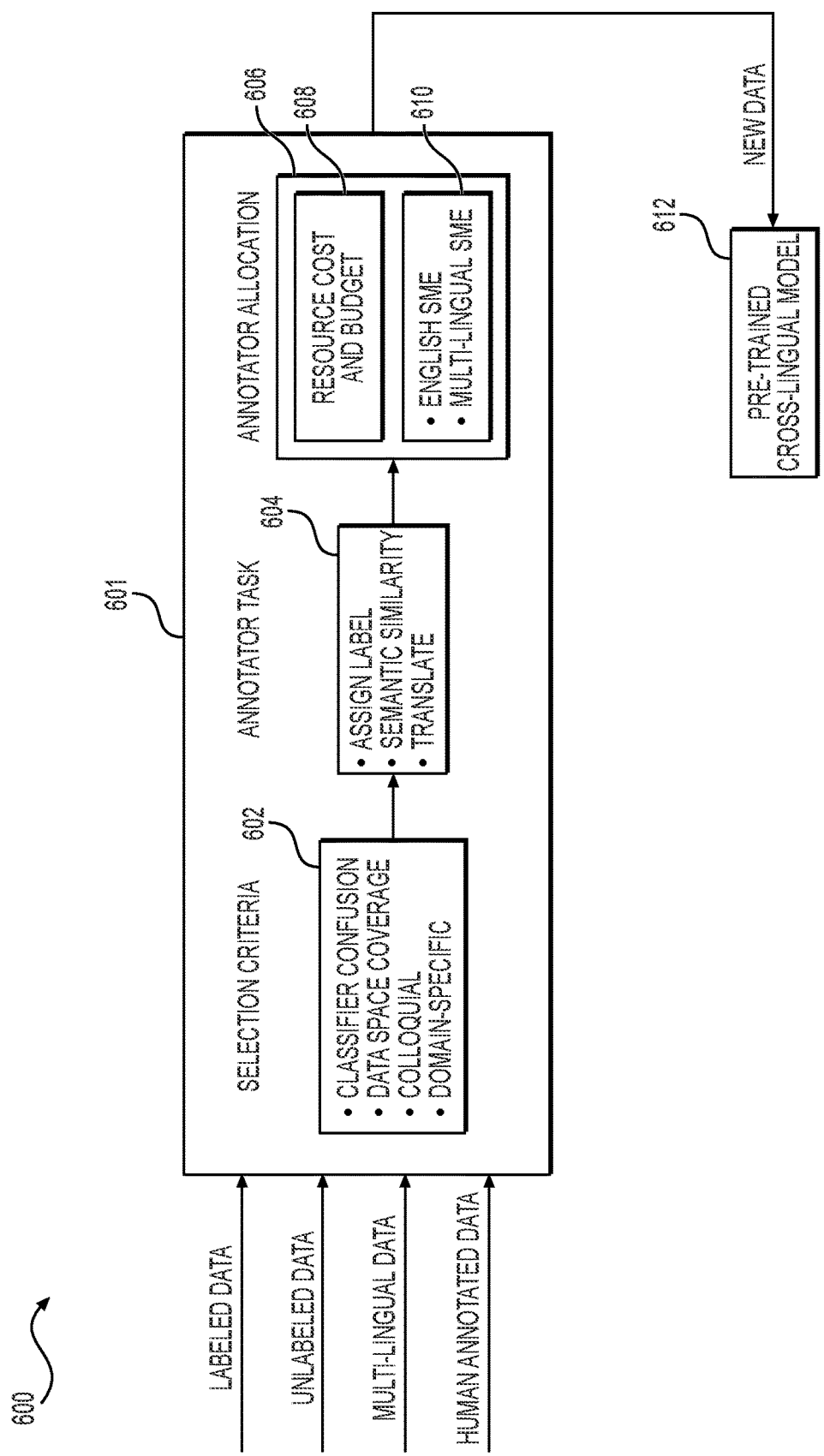
FIG. 6 illustrates a flow diagram of operations for machine learning on text data using, in accordance with an embodiment of the present disclosure, an active semi-supervised multi-lingual machine learning technique.

Now referring specifically to FIG. 6, FIG. 6 illustrates a flow diagram 600 of operations for machine learning on text data using, in accordance with an embodiment of the present disclosure, an active semi-supervised multi-lingual machine learning technique. FIG. 6 corresponds to a situation wherein the available training resources (inputs) include (see, e.g., FIG. 1), labeled English data, unlabeled English and/or unlabeled non-English data, and the resource of an available multi-lingual human annotator. Accordingly, as shown in FIG. 6, the inputs to block 601 can be one or more of labeled data, unlabeled data, multi-lingual data, and/or human annotated data. In some embodiments, the human annotated data input can come from English speakers, non-English speakers, subject matter experts (SMEs), and/or multi-lingual speakers.

The illustrated embodiment of FIG. 6 particularly applies where there is selection criteria involved, as discussed in detail above, in order to find or select samples to address certain confusion or specific situations. For instance, as shown at 602, the selection criteria can be based on one or more of classifier confusion, data space coverage, colloquial language, and/or domain-specific issues. Because each of these selection criterion are described in detail above, a detailed discussion will not be provided here.

From block 602, then according to the applicable issue/situation, then one or more specific tasks are assigned to a human annotator (see "Annotator task" block 604). The annotator tasks assigned accordingly can involve one or more of: the annotator assigning a label, providing the annotator with two sentences and asking them if they are semantically similar, and/or asking the annotator to simply translate the sentence. At the next block, annotator allocation considerations are taken into consideration, including resource cost and budget, as described in further detail above. For instance, as described above, these considerations can factor in client budget for completing the machine-learning task and/or the availability or time availability of specific annotators. As shown at 610, the annotators here may be, for example, subject matter experts (SMEs) and/or multi-lingual SMEs. The output from block 606 is then new data that flows to another pre-trained, cross-lingual model 612.

FIG. 7 illustrates the internal structure and flow-function of a model as described herein with respect to certain models, with attention ensemble machine learning using neural networks, and specific encoders. Multiple cross-lingual encoders may be used, and they may be context specific (e.g., particularly advantageous for conduct surveillance type implementations). For example, the cross-lingual encoders 702, 706, 710 can be recurrent neural networks (RNN), Long-Short Term Memory networks (LSTM), Gated Recurrent Unites networks (GRU), Transformer networks, or any sequence-to-sequence neural networks architectures, and the encoders may feed into various types of neural networks 704, 708, and 712, for example fully connected neural networks layers, Transformer layers, or many other neural network architectures. Output from the multiple neural networks feeds into an attention ensemble (described in further detail above), at 714, then concatenation occurs at 716. Next, the output of concatenation is a fully connected neural network (see 718), producing a resulting cross-lingual sentence representation 720.

Figure 8:
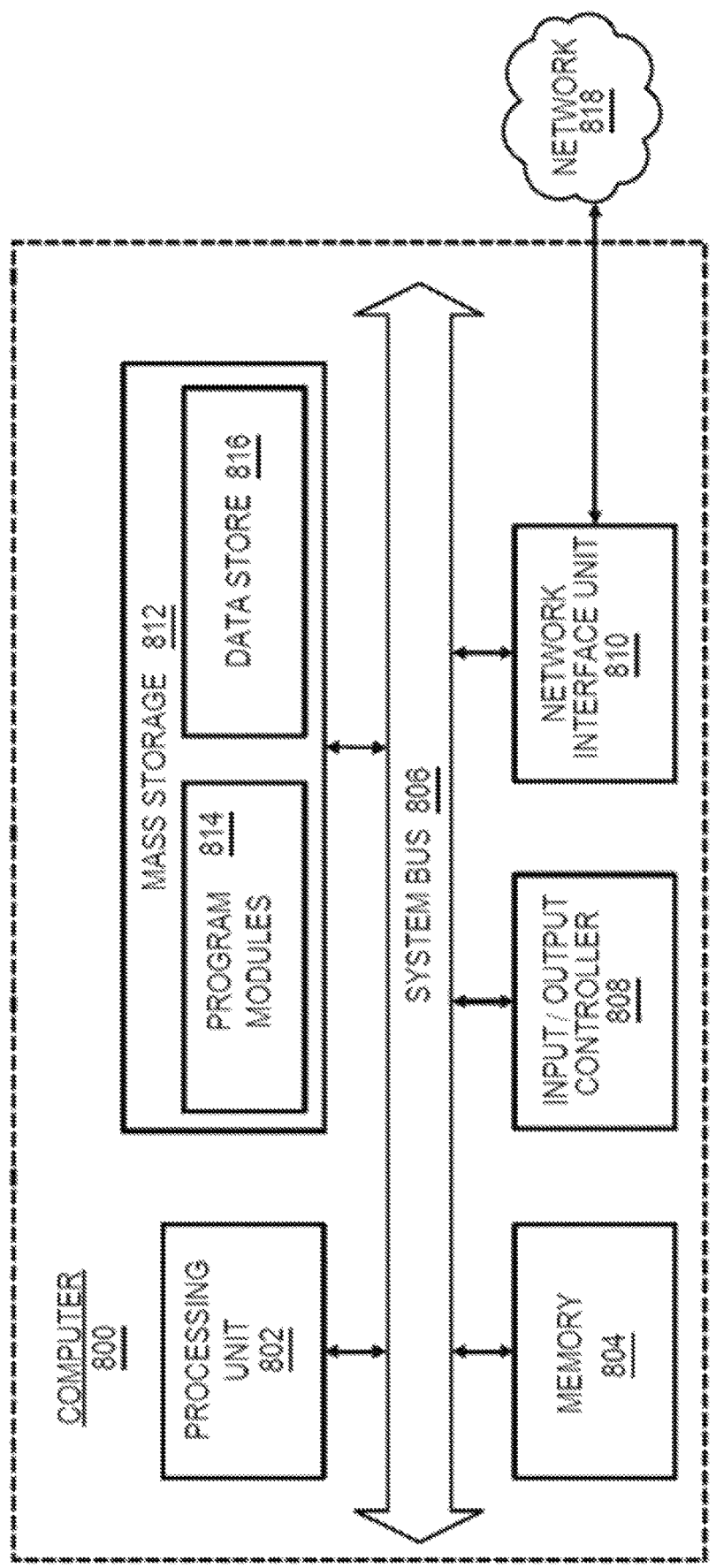
FIG. 8 is a diagram illustrating a computer hardware architecture for a computing system capable of implementing one or more embodiments of the present disclosure.

FIG. 8 is a computer architecture diagram showing a general computing system capable of implementing one or more embodiments of the present disclosure described herein. A computer 800 may be configured to perform one or more functions associated with embodiments illustrated in one or more of FIGS. 1-7 and 9. It should be appreciated that the computer 800 may be implemented within a single computing device or a computing system formed with multiple connected computing devices. For example, the computer 800 may be configured for a server computer, desktop computer, laptop computer, or mobile computing device such as a smartphone or tablet computer, or the computer 800 may be configured to perform various distributed computing tasks, which may distribute processing and/or storage resources among the multiple devices.

As shown, the computer 800 includes a processing unit 802, a system memory 804, and a system bus 806 that couples the memory 804 to the processing unit 802. The computer 800 further includes a mass storage device 812 for storing program modules. The program modules 814 may include modules executable to perform one or more functions associated with embodiments illustrated in one or more of FIGS. 1-7. The mass storage device 812 further includes a data store 816.

The mass storage device 812 is connected to the processing unit 802 through a mass storage controller (not shown) connected to the bus 806. The mass storage device 812 and its associated computer storage media provide non-volatile storage for the computer 800. By way of example, and not limitation, computer-readable storage media (also referred to herein as "computer-readable storage medium" or "computer-storage media" or "computer-storage medium") may include volatile and non-volatile, removable and non-removable media implemented in any method or technology for storage of information such as computer-storage instructions, data structures, program modules, or other data. For example, computer-readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 800. Computer-readable storage media as described herein does not include transitory signals.

According to various embodiments, the computer 800 may operate in a networked environment using connections to other local or remote computers through a network 818 via a network interface unit 810 connected to the bus 806. The network interface unit 810 may facilitate connection of the computing device inputs and outputs to one or more suitable networks and/or connections such as a local area network (LAN), a wide area network (WAN), the Internet, a cellular network, a radio frequency network, a Bluetooth-enabled network, a Wi-Fi enabled network, a satellite-based network, or other wired and/or wireless networks for communication with external devices and/or systems.

The computer 800 may also include an input/output controller 808 for receiving and processing input from a number of input devices. Input devices may include, but are not limited to, keyboards, mice, stylus, touchscreens, microphones, audio capturing devices, or image/video capturing devices. An end user may utilize such input devices to interact with a user interface, for example a graphical user interface on one or more display devices (e.g., computer screens), for managing various functions performed by the computer 800, and the input/output controller 808 may be configured to manage output to one or more display devices for visually representing data.

The bus 806 may enable the processing unit 802 to read code and/or data to/from the mass storage device 812 or other computer-storage media. The computer-storage media may represent apparatus in the form of storage elements that are implemented using any suitable technology, including but not limited to semiconductors, magnetic materials, optics, or the like. The program modules 814 may include software instructions that, when loaded into the processing unit 802 and executed, cause the computer 800 to provide functions associated with embodiments illustrated in FIGS. 1-7 and 9. The program modules 814 may also provide various tools or techniques by which the computer 800 may participate within the overall systems or operating environments using the components, flows, and data structures discussed throughout this description. In general, the program module 814 may, when loaded into the processing unit 802 and executed, transform the processing unit 802 and the overall computer 800 from a general-purpose computing system into a special-purpose computing system.

The processing unit 802 may be constructed from any number of transistors or other discrete circuit elements, which may individually or collectively assume any number of states. More specifically, the processing unit 802 may operate as a finite-state machine, in response to executable instructions contained within the program modules 814. These computer-executable instructions may transform the processing unit 802 by specifying how the processing unit 802 transitions between states, thereby transforming the transistors or other discrete hardware elements constituting the processing unit 802. Encoding the program modules 814 may also transform the physical structure of the computer-readable storage media. The specific transformation of physical structure may depend on various factors, in different implementations of this description. Examples of such factors may include, but are not limited to: the technology used to implement the computer-readable storage media, whether the computer-readable storage media are characterized as primary or secondary storage, and the like. For example, if the computer-readable storage media are implemented as semiconductor-based memory, the program modules 814 may transform the physical state of the semiconductor memory, when the software is encoded therein. For example, the program modules 814 may transform the state of transistors, capacitors, or other discrete circuit elements constituting the semiconductor memory.

As another example, the computer-storage media may be implemented using magnetic or optical technology. In such implementations, the program modules 814 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present disclosure.

Figure 9:
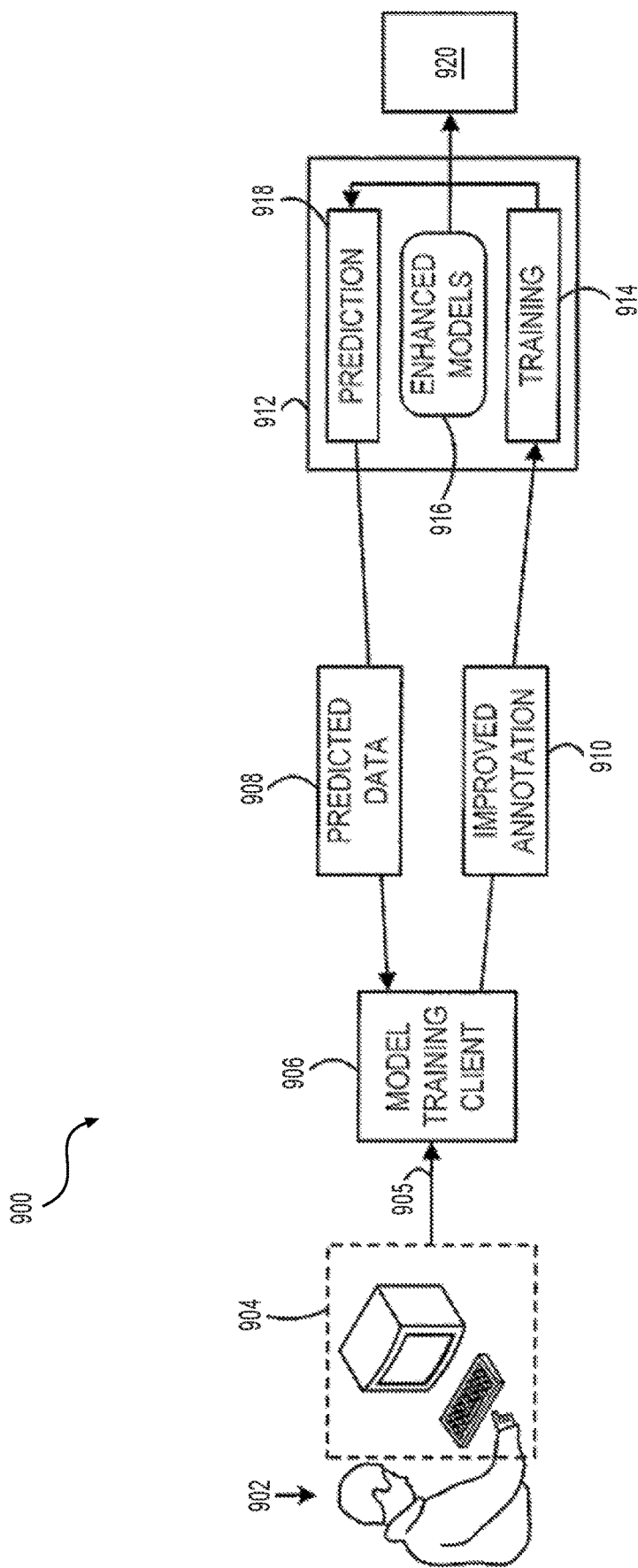
FIG. 9 is a diagram illustrating an exemplary system for machine learning with the involvement of an annotator, and capable of implementing one or more embodiments of the present disclosure.

FIG. 9 is a diagram illustrating architecture of an exemplary system 900 for machine learning in which one or more example embodiments described herein may be implemented. As shown, the system 900 includes a user computer 904 operated by a user 902 (which may be an "annotator" or a compliance officer, etc.). The user computer 904 can include some or all of the components of the computer 800 shown in FIG. 8 and described in further detail above. A user interface such as a graphical user interface executing on the computer 904 may be configured to receive user input 905. By interacting with the user interface of the user computer 904, the user 902 may perform, via a model training client 906, functions associated with model training according to some embodiments described herein. Generated models such as enhanced models 916 may be provided to other applications or components (collectively represented by reference numeral 920) for performing various natural language processing (NLP) functions at other locations in a larger system and/or using resources provided across multiple devices of a distributed computing system.

A base model may be used to predict identifications of potential violation conditions for a first electronic communication such as a message. Users 902 such as analysts may then correct any incorrect predictions, add new identifications, add definitions, input new features or change weighting of previous features, add notations, etc. The resulting corrected data may then be used to train a new model based on just the corrections and/or additions made to the predictions on the first electronic communication. This new model may then be used to predict identifications on a second electronic communication. The corrections made to predictions on the second electronic communication may then be used to create a new model and predict identifications on a third electronic communication, and so on accordingly. This prediction, correction, and training process may progressively improve a model as additional electronic communications are processed. Improved identification 910, training 914, predictions 918, and predicted identification operations 908 may be managed via the model training client 906. Training 914, prediction 918, and storage of enhanced models 916 can be implemented on the user computer 904 or another computer 912, which may be locally or remotely coupled to and in communication with user computer 904, via a communication link such as a wired or wireless network connection.

The various example embodiments described above are provided by way of illustration only and should not be construed to limit the scope of the present disclosure. Certain patentable aspects of the present disclosure are presented in the appended claims. Those skilled in the art will readily recognize various modifications and changes that may be made to the present disclosure without following the example embodiments and applications illustrated and described herein, and without departing from the true spirit and scope of the present disclosure.

What is claimed is:

1. A method for multilingual machine learning on text data, comprising:
    receiving English-language labeled training data comprising at least one indication of human conduct that violates a policy, ethical standard, and/or law;
    applying a pre-trained cross-lingual model to the received labeled training data;
    applying zero-shot machine learning to the received labeled training data to generate supervised learning task specific layers;
    producing a zero-shot machine learning model comprising applying the pre-trained cross-lingual model to input data to generate an output and applying the supervised learning task specific layers to the output to generate a classification; and
    applying the zero-shot machine learning model to unlabeled unseen text data to perform functions including the classification of unseen text data to detect at least one identification of a potential violation condition.

2. The method of claim 1, wherein the text data corresponds to one or more electronic communications between persons.

3. The method of claim 2, wherein the text classification includes identifying the unseen text data as corresponding to conduct of the persons.

4. The method of claim 1, wherein the cross-lingual model is pre-trained based on one or more spoken languages as represented in labeled training data.

5. The method of claim 1, wherein the text data comprises at least one of a sentence, paragraph, or document.

6. A method for multilingual machine learning on text data, comprising:
    receiving labeled and/or unlabeled English training data comprising at least one indication of human conduct that violates a policy, ethical standard, and/or law;
    receiving labeled and/or unlabeled non-English training data;

applying a pre-trained cross-lingual model to the received training data to generate supervised learning task specific layers;

generating a semi-supervised multi-lingual model comprising applying the pre-trained cross-lingual model to input data to generate an output and applying the supervised learning task specific layers to the output to generate a classification; and applying the semi supervised multi-lingual model to unseen multi-lingual text data to perform functions including the classification of unseen text data to detect at least one identification of a potential violation condition.

7. The method of claim 6, wherein the text data corresponds to one or more electronic communications between persons.

8. The method of claim 6, wherein the unseen multi-lingual text data comprises at least one of a sentence, paragraph, or document that includes multiple languages.

9. A method for multilingual machine learning on text data, comprising:

receiving labeled data, unlabeled data, multi-lingual data, and human annotated data;

applying a selection criteria;

based at least in part on the selection criteria, providing text data to one or more annotators to perform one or more functions that include at least one of assigning a label to the text data, evaluating semantic similarity, or translating the text data;

generating a multi-lingual model based at least in part on the functions performed by the one or more annotators; and applying the multi-lingual model to unseen text data to produce a pre-trained cross-lingual model.

10. The method of claim 9, further comprising using an annotator allocation resource cost and/or budget to determine the one or more functions performed by the one or more annotators.

11. The method of claim 10, wherein a number and/or type of the one or more annotators is based at least in part on the resource cost and/or budget.

12. The method of claim 9, wherein a type of the one or more annotators comprises an English-speaking subject matter expert or a multi-lingual subject matter expert.

13. The method of claim 9, wherein the selection criteria comprises at least one of classifier confusion, data space coverage, colloquial language, domain-specific language, or idiomatic language.

14. A system for multilingual machine learning on text data, comprising:

a plurality of cross-lingual encoders coupled to a corresponding plurality of neural networks; and an attention-based ensemble encoder component configured to receive an output of the plurality of neural networks, wherein the system is configured to classify the outputs of the plurality of neural networks by detecting at least one identification of a potential violation condition.

15. The system of claim 14, further comprising a component configured for performing concatenation, received from the attention-based ensemble encoder.

16. The system of claim 14, further comprising a fully connected neural network configured to produce a cross-lingual sentence representation.

17. The system of claim 14, wherein an output of each of the plurality of cross-lingual encoders is input into a corresponding one of the corresponding plurality of neural networks.

* * * * *